United States Patent
Ishimaru

(10) Patent No.: US 6,427,155 B1
(45) Date of Patent: Jul. 30, 2002

(54) ELECTRONIC DOCUMENT DISPLAY, DOCUMENT DISPLAY METHOD AND RECORDING MEDIUM

(75) Inventor: Kenji Ishimaru, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 08/983,585
(22) PCT Filed: May 22, 1997
(86) PCT No.: PCT/JP97/01726
§ 371 (c)(1), (2), (4) Date: Jan. 21, 1998
(87) PCT Pub. No.: WO97/44748
PCT Pub. Date: Nov. 27, 1997

(30) Foreign Application Priority Data

May 22, 1996 (JP) .............................................. 8-127107

(51) Int. Cl.[7] .............................. G06F 17/21; G06T 3/20
(52) U.S. Cl. ....................................... 707/529; 707/526
(58) Field of Search ............................... 707/529, 526, 707/3, 1, 102, 530, 531, 532, 536; 345/326

(56) References Cited

U.S. PATENT DOCUMENTS

| | | | | |
|---|---|---|---|---|
| 5,551,024 A | * | 8/1996 | Waters | 707/3 |
| 5,615,337 A | * | 3/1997 | Zimowski et al. | 707/3 |
| 5,701,473 A | * | 12/1997 | Braseth et al. | 707/205 |
| 5,832,480 A | * | 11/1998 | Byrd, Jr. et al. | 707/5 |

FOREIGN PATENT DOCUMENTS

| | | |
|---|---|---|
| JP | 57-144155 | 3/1956 |
| JP | 58-64567 | 4/1983 |
| JP | 62-139041 | 6/1987 |
| JP | 62-221028 | 9/1987 |
| JP | 1-265324 | 10/1989 |
| JP | 3-237561 | * 10/1991 |
| JP | 4-127372 | 4/1992 |
| JP | 6-12458 | 1/1994 |
| JP | 6-96135 | 4/1994 |
| JP | 6-251082 | 9/1994 |

OTHER PUBLICATIONS

U.S. Patent and Trademark Office, Text search and retrievel training manual for the Automated Patent System (APS), APS, pp. 2–11, 2–17, 3–28, 5–3, 5–11, 6–10, 6–16, and 6–17, Jan. 1996.*
Microfilm of the specification an drawings annexed to the written application of Japanese Utility Model Application No. 309955/1981 (Laid–Open No. 14415/1982) (Canon Inc.), Sep. 10, 1982 (Family: none).

* cited by examiner

*Primary Examiner*—Hosain T. Alam
*Assistant Examiner*—Alford W. Kindred
(74) *Attorney, Agent, or Firm*—Finnegan, Henderson, Farabow, Garrett & Dunner, L.L.P.

(57) ABSTRACT

To provide an electronic dictionary that stylizes the display based on data pertaining to the number of times and frequency with which a search is performed, thereby making it easy to use, and to provide an electronic dictionary that can be used by a plurality of users.

The device comprises a keyboard 1a and a mouse 1b, a dictionary memory 6 for storing text electronically, mark files 7-1, . . . , 7-n which store attribute data relating to text that has been searched for one or more times in the dictionary memory 6, a display component 5 for displaying text that has been searched for, and a CPU 3 for displaying searched for text in the display area 5 while changing the color based on the attribute data from the mark file 7 and for searching the dictionary memory 6 upon receiving an output signal from the input method 1a or 1b.

46 Claims, 11 Drawing Sheets

FIG.8

ENGLISH WORD SELECTED

| FILE | SEARCH | SCOPE | MARK | HELP |
|------|--------|-------|------|------|

→ construct  [TRANSITIVE VERB] 組み立てる construction  [NOUN] 建設,建築（工事,物）    ADD MARK
                                            REMOVE MARK   構成する constructive  [ADJECTIVE] 建設的な;構造上の construe  [VERB] 解釈する;文法的に解剖する consul  [NOUN] 領事;(古代ローマの) 執政官 consulate  [NOUN] 領事の職[任期];領事館

FIG.9

| FILE | SEARCH | SCOPE | MARK | HELP |
|------|--------|-------|------|------| construct    [TRANSITIVE VERB] 組み立てる;建造する;構成する construction  [NOUN] 建設,建築（工事,物） constructive [ADJECTIVE] 建設的な,構造上の construe     [VERB] 解釈する;文法的に解剖する consul       [NOUN] 領事;(古代ローマの) 執政官 consulate    [NOUN] 領事の職[任期];領事館

| | WORD (7w-1) | MARK NUMBER (7w-2) | TIME AND DATE OF PREVIOUS SEARCH (7w-3) |
|---|---|---|---|
| WORD DEFINITION (7w) | construct | 1 | 4/26, 16:00 |
| | book | 20 | 3/31, 9:30 |
| | trouble | 14 | 4/10, 19:00 |
| | despite | 7 | 4/20, 13:30 |
| | ⋮ | ⋮ | ⋮ |

FIG.12

| FREQUENCY OF SEARCH | COLOR |
|---|---|
| 5TIMES/MONTH | GREEN |
| 10TIMES/MONTH | YELLOW |
| 15TIMES/MONTH | RED |
| ⋮ | ⋮ |

7C COLOR DEFINITION 7C-3 FREQUENCY OF SEARCH 7C-2 COLOR

ELECTRONIC DOCUMENT DISPLAY, DOCUMENT DISPLAY METHOD AND RECORDING MEDIUM

TECHNICAL FIELD

The present invention relates to an electronic text display device and to a method for displaying electronic texts which is used to search electronically for information corresponding to an input character string, and more particularly to a technology which makes it possible for the user to mark a searched item.

BACKGROUND ART

An example of this type of electronic text display device and method for displaying electronic texts is an electronic dictionary. An electronic dictionary contains dictionary data, such as that for a Japanese character dictionary, Japanese-to-English dictionary, or an English-to-Japanese dictionary, stored in semiconductor memory (ROM) or on a magnetic disk, and is provided with computer functions for searching for Japanese characters using phonetic input (if the dictionary is a Japanese character dictionary) or searching for Japanese equivalents of input English words (if the dictionary is an English-Japanese dictionary). In the case of a Japanese character dictionary, the memory stores font data for creating Japanese characters, table data for conducting searches (similar to the index tables used to indicate data storage locations), and dictionary data, each in a compressed format. Hereinafter, electronic text display devices and methods for displaying electronic texts will simply be referred to as "electronic dictionaries".

Unlike an ordinary dictionary which is not dependent on electronic means, an electronic dictionary does not allow the user to mark lines. As a result, the user cannot tell whether a word he or she are searching for is one that he or she has looked up in the past.

Japanese Laid-Open Patent Application 3-237561 discloses a device intended to resolve this problem. The disclosed invention relates to an electronic dictionary that provides added convenience for the user by allowing the user to search word information for previously searched words and, in the event that a word marked previously by the user during an initial search is displayed, displaying the previously marked word in a highlighted display, or with the message "memorized" next to it.

Although this electronic dictionary informs the user that a search has been conducted previously for a particular word, other information, such as how many times a word has been searched for in the past, when the word was last searched for, or how frequently the word has been searched for, is not provided. In addition, the rudimentary display configuration of the electronic dictionary disclosed in the aforementioned publication is not convenient for the user to work with. Furthermore, when more than one person uses the same dictionary, a user cannot determine which user actually looked up a particular word.

DISCLOSURE OF THE INVENTION

It is an object of this invention to resolve these problems. The first object is to provide an electronic dictionary that can display previously searched for text, applying attributes which reflect the number of times that the text has been searched for previously.

The second object is to provide an electronic dictionary that can be used by more than one person.

The third object is to provide an electronic dictionary that can automatically select the text to be used by each user.

The fourth object is to provide an electronic dictionary that informs the user that a prior search has been performed.

The fifth object is to provide an electronic dictionary that prevents accumulation of outdated attribute data.

The sixth object is to provide an electronic dictionary that informs the user of how many times a search has been performed The seventh object is to provide an electronic dictionary that facilitates visual recognition of text attribute data by the user.

The eighth object is to provide an electronic dictionary that prevents users from overlooking text attribute data.

The electronic text display device disclosed in Claim 1 corresponds to the first object. It comprises input means for indicating text to be searched for, first memory means for storing a text table composed of one or more records, second memory means for storing attribute information indicating the search status of a record that has been searched for one or more times from the first memory means, display means for displaying the record searched for, and processing means for receiving an output signal from the input means, searching the first memory means for the record indicated by the output signal, reading out from the second memory means the attribute data corresponding to the record being searched for, and displaying on the display means the applicable record using a display status configuration which is based on the read out attribute data.

"Attribute data" includes the number of times an item has been searched for, the search frequency, and the search time and date. In other words, the attribute data relates to the search status. In addition, "display configurations" include attaching a special mark to the displayed text, displaying the text in highlighted display, changing the display color, displaying flashing text, or changing the font to or from Mincho, Gothic, or the like. Any display configuration that allows the text to be distinguished from the surrounding text may be used. In addition, "record" searches can be conducted not only on text fields, but also on fields such as number searches, translation, meaning, or the like.

The electronic text display device disclosed in Claim 2 corresponds to the first object, and provides an electronic text display device as defined in Claim 1, wherein the processing means, in the course of searching for a record from the first memory means, updates, on the basis of the new search, the attribute data which is associated with this record and which is stored in the second memory means.

The electronic text display device disclosed in Claim 3 corresponds to the first object, and provides an electronic text display device as defined in Claim 1, wherein the processing means, in the course of searching for a record from the first memory means, creates attribute data associated with this record in the event that attribute data associated with this record is not stored in the second memory means.

The electronic text display device disclosed in Claim 4 corresponds to the second object, and provides an electronic text display device as defined in any of Claims 1 through 3, wherein the second memory means comprises a plurality of memory areas created for each of a plurality of users, each of this plurality of memory areas storing attribute data.

The electronic text display device disclosed in Claim 5 corresponds to the third object, and provides an electronic text display device as defined in any of Claims 1 through 4, wherein the first memory means stores text tables of a plurality of types, the plurality of memory areas in the aforementioned second memory means store data designating which of the plurality of types of text table should be used, and based on this designation data, the processing means searches for the corresponding text table in the first memory means.

The electronic text display device disclosed in Claim 6 corresponds to the fourth object, and provides an electronic text display device as defined in any of Claims 1 through 5, further comprising a timer which outputs a time signal, wherein the processing means stores the time signal when the first memory means is searched, and additionally displays the search time based on the aforementioned time signal on the electronic text display device.

The electronic text display device disclosed in Claim 7 corresponds to the fifth object, and provides an electronic text display device as defined in Claim 6, wherein the processing means refers to time signals from the timer to erase at prescribed times attribute data stored in the second memory means.

The electronic text display device disclosed in Claim 8 corresponds to the fifth object, and provides an electronic text display device as defined in any of Claims 1 through 6, wherein, in the event that the number of times that attribute data has not been updated during previous searches exceeds a prescribed number, the attribute data is erased.

The electronic text display device disclosed in Claim 9 corresponds to the sixth object, and provides an electronic text display device as defined in any of Claims 1 through 8, wherein the processing means stores a count of the number of times that a search has been performed for a given record, and stores this value as attribute data in the second memory means.

The electronic text display device disclosed in Claim 10 corresponds to the sixth object, and provides an electronic text display device as defined in any of Claims 1 through 8, wherein the processing means stores the search frequency for a given record as attribute data in the second memory means.

The electronic text display device disclosed in Claim 11 corresponds to the seventh object, and provides an electronic text display device as defined in any of Claims 1 through 8, wherein the processing device makes reference to the attribute data stored in the second memory to modify the color of the record display.

The electronic text display device disclosed in Claim 12 corresponds to the eighth object, and provides an electronic text display device as defined in any of Claims 1 through 8, wherein the processing device makes reference to the attribute data stored in the second memory to cause the record display to flash.

The electronic text display method disclosed in Claim 13 corresponds to the first object, and provides an electronic text display method comprising a first step in which a first memory means, which stores a text table composed of one or more records, is searched when an output signal is received from an input means for initiating a text search; a second step in which attribute data indicating the search status of a record which has been searched for one or more times from the aforementioned first memory means in the first step is read out from the second memory means; and a third step in which the record searched for in the first step is displayed in the display configuration associated with the attribute data read out in the second step.

The storage medium disclosed in Claim 14 corresponds to the first object, and provides a machine-readable storage medium for storing a program for executing a process comprising a first step in which an output signal is received by a computer from an input means for initiating a text search, and a first memory means, which stores a text table composed of one or more records, is searched; a second step in which attribute data indicating the search status of a record which has been searched for one or more times from the first memory means in the first step is read out from a second memory means; and a third step in which the record searched for in the first step is displayed in the display configuration associated with the attribute data read out in the second step.

The storage medium includes flexible disks, fixed disks, magnetic tape, magnetooptical discs, CD-ROM, DVD, ROM cartridges, RAM memory cartridges with battery back-up, flash memory cartridges, and non-volatile RAM cartridges.

It also includes telephone lines and other hard-wired communications media, and microwave circuits and other wireless communications media. Here, "communications media" also includes the Internet.

BRIEF DESCRIPTION OF THE DRAWINGS

FIG. 8 shows an example of a display screen used for the electronic dictionary of Embodiment 1 of this invention;

FIG. 9 shows an example of a display screen used for the electronic dictionary of Embodiment 1 of this invention;

FIG. 12 shows another example of the internal structure of the mark files in the electronic dictionary of Embodiment 1 of this invention.

BEST MODE FOR CARRYING OUT THE INVENTION

A favorable embodiment of this invention is described below, making reference to the drawings. This embodiment relates to implementation of the electronic text display device of the present invention in an electronic dictionary.

(Constitution)

Figure 1:
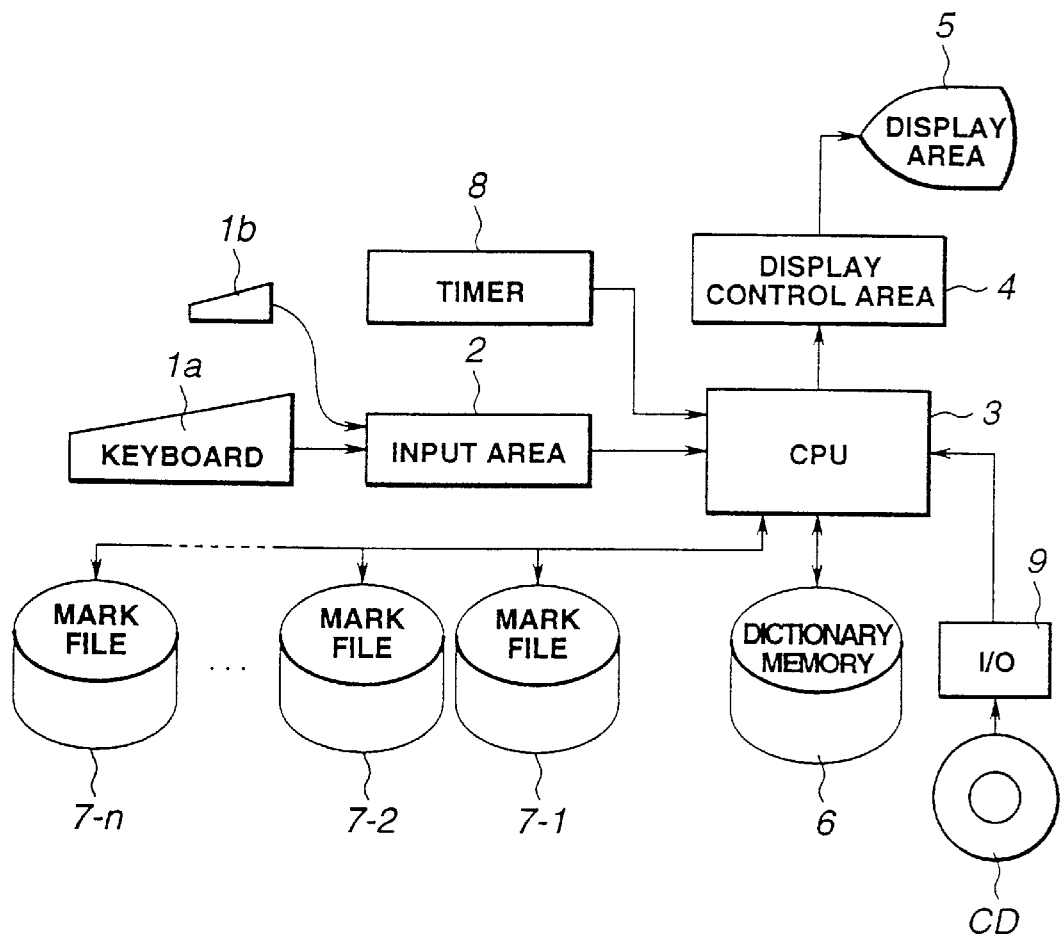
FIG. 1 is a block diagram of the functions of the electronic dictionary of Embodiment 1 of this invention.

FIG. 1 shows a block diagram of the functions of an English-Japanese electronic dictionary. As shown in FIG. 1, this electronic dictionary comprises a keyboard 1*a*, a mouse 1*b*, an input component 2, a CPU 3, a display control component 4, a display component 5, a dictionary memory 6, a mark file 7, a timer 8, and an interface component 9.

The keyboard 1a and the mouse 1b constitute the input means in this invention. They are constituted so as to allow a user to indicate a desired record. The input area 2 is constituted so as to receive an output signal from the input component of the keyboard 1a and send this to the CPU 3. The CPU 3 is constituted so as to function as the processing means for this invention by implementing the program provided from a disk, CD, or other storage medium. In other words, the CPU is constituted so as to be able to search for text or other record designated through the input means, i.e., the keyboard.

The display control component 4 constitutes the display means of this invention. It is constituted so as to be able to produce signals for display text records using the display format instructed by the CPU. The display component 5 is constituted so as to be able to display searched text on signals generated under the control of the display control component 4. The display component 5 comprises a CRT, a liquid crystal display capable of displaying colors, a plasma display, or other device.

The dictionary memory 6 is the first memory means of this invention. It is constituted so as to store an English-Japanese dictionary database (hereafter simply called a "dictionary") for use in searches, that is, the text table in this invention. The dictionary memory 6 can also be constituted so as to store a database for a Japanese-English dictionary, a Japanese language dictionary, a Japanese character dictionary, or an encyclopedia.

The mark file 7 represents the second memory means of this invention. It is composed of the multiple mark files 7-1, ..., 7-n, in other words the memory areas. Each mark file 7-1, ..., 7-n is designed to store attribute data such as the color in which searched text is to be displayed. These mark files 7 are independent, and can be constituted such that write/read operations are possible for various different users, or for various different conditions. The timer 8 is designed to be able to output calendar information and time information to the CPU 3.

The dictionary memory 6 and the mark file 7 may comprise different memory means (fixed disk, semiconductor memory, etc.) or different partitions in the same memory means.

Figure 4:
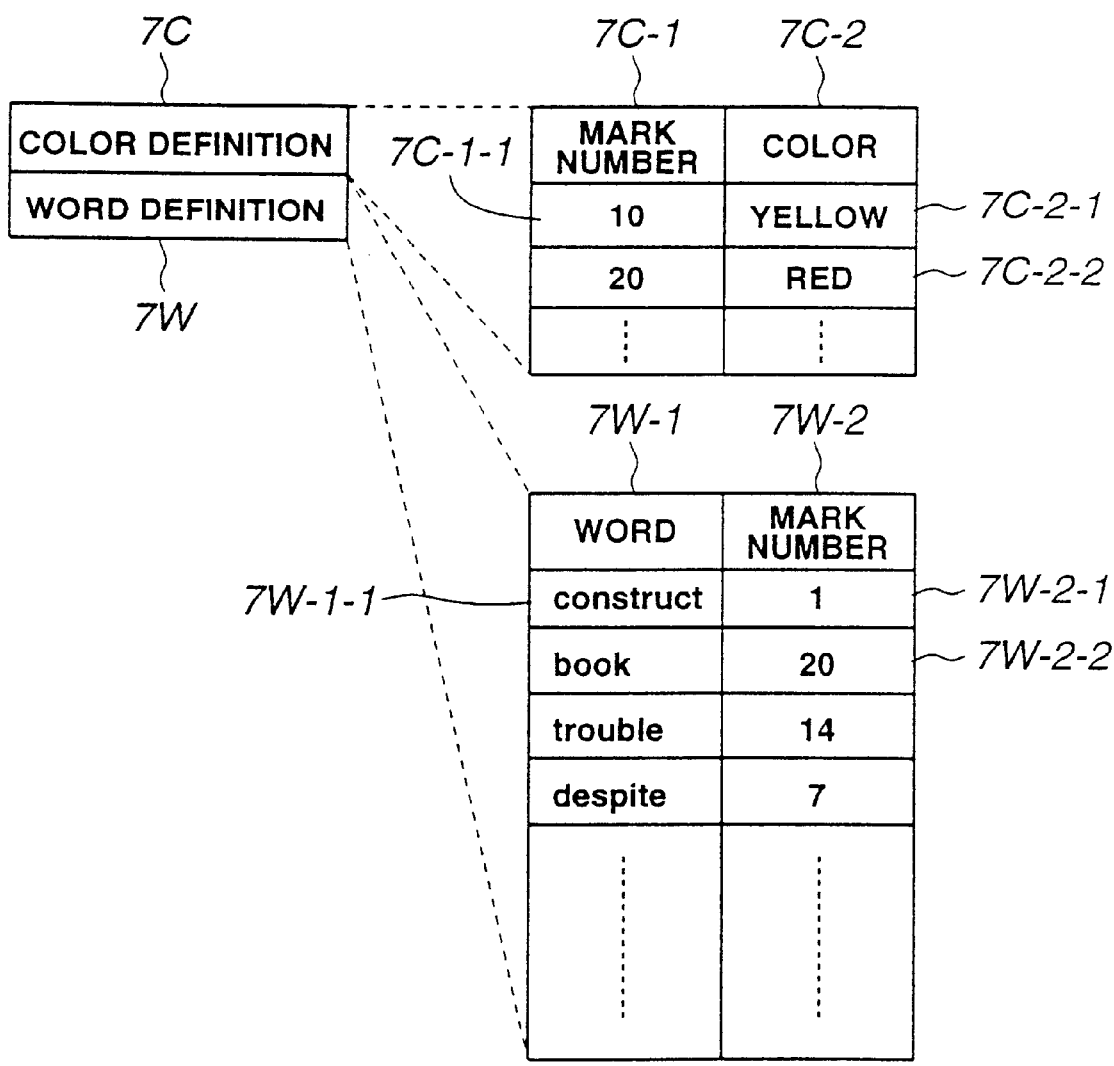
FIG. 4 shows an example of the internal structure of the mark files in the electronic dictionary in Embodiment 1 of this invention.

FIG. 4 shows the internal structure of a mark file 7. AS can be seen at the left side of the drawing, the mark file 7 is provided with a color definition table 7C and a word definition table 7W. In addition, as can be seen in the right side of the drawing, the color definition table 7c contains a mark number field 7C-1 corresponding to the total number of searches and a color field 7C-2 for text information displayed by the display component 5. In other words, the field indicating the mark number and the color field are designated for the information for one word, that is to say for each record.

Hereinafter, the symbol x-y-z is used to represent the table number-field number-record number.

In this drawing, the color corresponding to the record (7C-1-1) for which the field indicating the mark number is 10 is yellow (7C-2-1). The color corresponding to the record (7C-1-2) for which the field indicating the mark number is 20 is red (7C-2-2). In this example, the mark is displayed in yellow on the screen for when the mark number is between 1 and 10, and the mark is displayed in red for when the mark number is between 11 and 20. Although the relationship between the mark number and color is arbitrary, when entrance exam students use the electronic dictionary to memorize words, an increase in the number of times a word is search for is undesirable. Consequently, as the mark number increases, the color progresses from green, to yellow, to a more stimulating color like red. This is beneficial because it attracts the user's attention.

In addition, in on this drawing, the mark number corresponding to the word "construct" is 1, the mark number corresponding to the word "book" is 20, the mark number corresponding to the word "trouble" is 14, and the mark number corresponding to the word "despite" is 7. The mark number refers to the cumulative number of times a search has been performed. The mark numbers for these words are set as described in the flow chart in FIG. 3, to be explained later.

Figure 5:
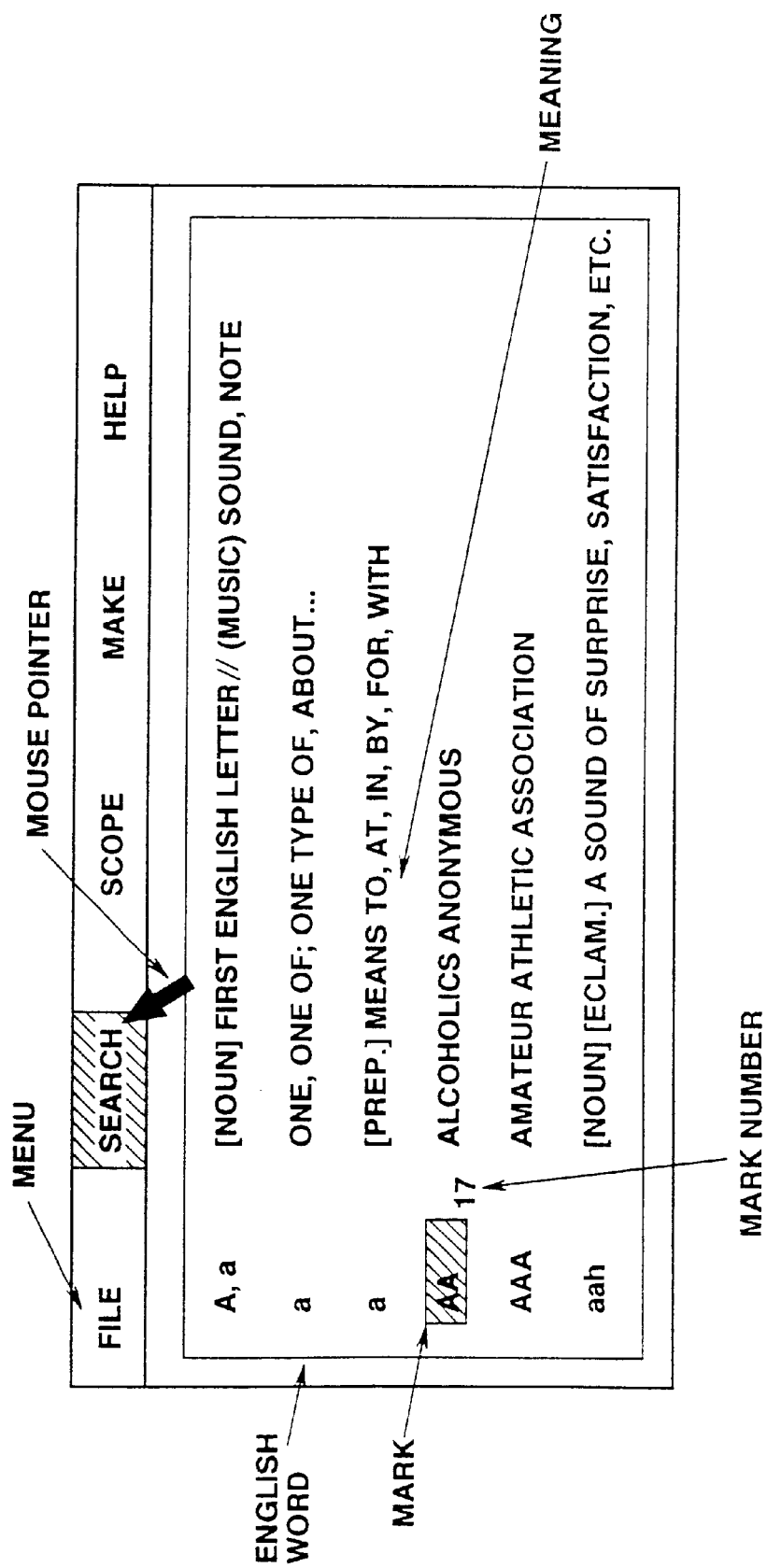
FIG. 5 shows an example of a display screen used for the electronic dictionary of Embodiment 1 of this invention.
Figure 6:
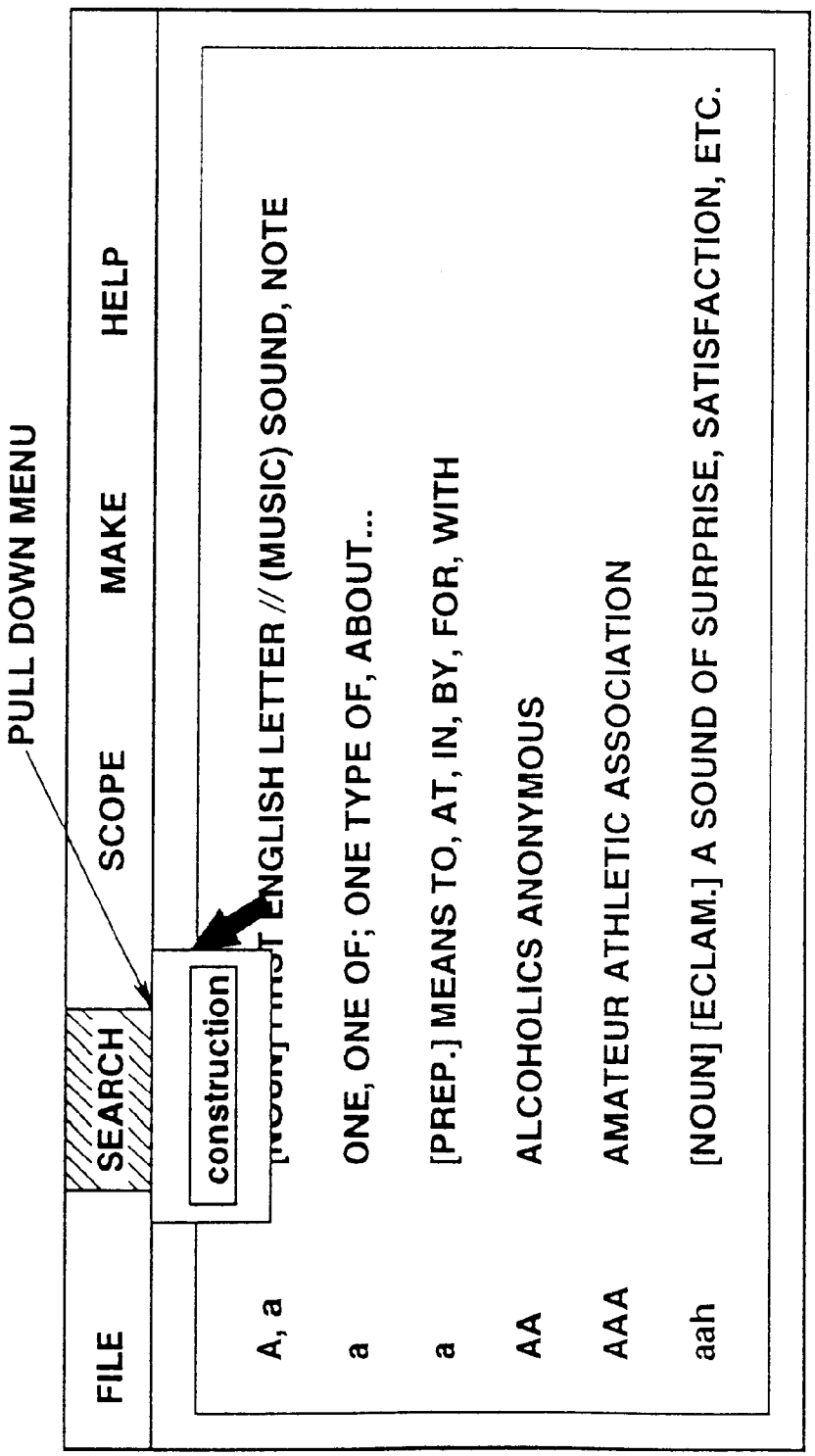
FIG. 6 shows an example of a display screen used for the electronic dictionary of Embodiment 1 of this invention.

FIG. 5 shows an example of the display screen of the display component 5. A menu bar is displayed in the upper region of the screen, and the dictionary display area appears below. Words in English appear on the left side of this display area, and the corresponding words in Japanese appear on the right. The word "AA" is marked, and the mark number is shown. What areas are marked and how they are marked is dependent on the mark file 7.

The device pertaining to Embodiment 1 of this invention comprises an electronic dictionary program and a mark file. The electronic dictionary program is a general electronic dictionary program. When many users use the electronic dictionary program, a mark file is created for each individual user.

(Operation)

Next, the operation will be described through the flow charts in FIGS. 2 and 3 and FIGS. 6 through 9.

The person using the electronic dictionary in FIG. 1 inputs a personal identification code from the keyboard 1a, whereby one of the mark files 7-1, ..., 7-n is selected. When no identification number is input, or when a person uses the device for the first time, an arbitrary mark file 7 is selected, or no mark file is selected. Alternatively, a new user mark file or an initialization mark file is created.

Figure 2:
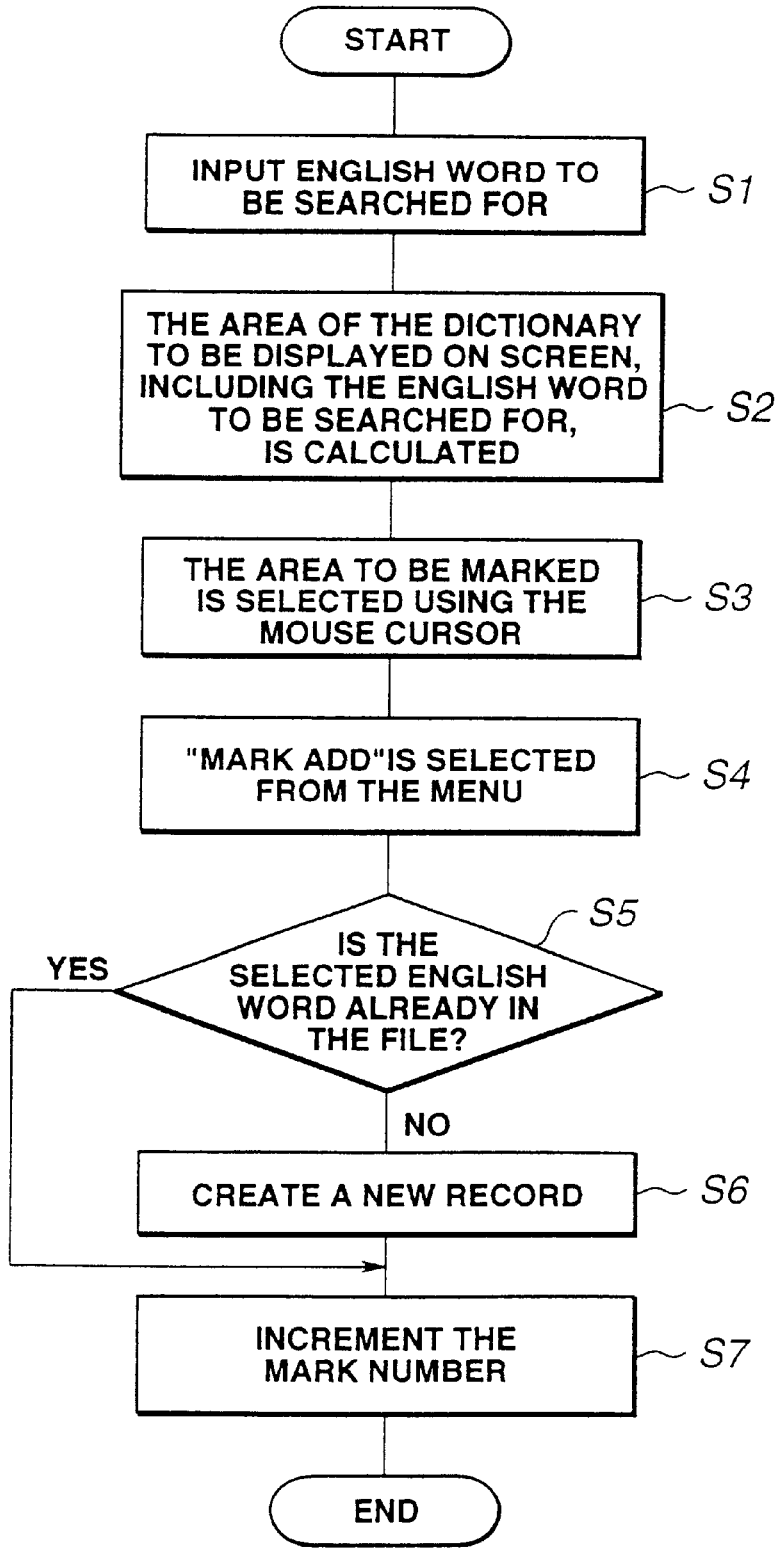
FIG. 2 is a flow chart of the process for adding marks to the electronic dictionary of Embodiment 1 of this invention.

Next, the user enters an English word to be searched for (Step S1 in FIG. 2).

The area of the dictionary for display on the screen, including the English word to be searched for, is calculated (Step S2).

Figure 7:
FIG. 7 shows an example of a display screen used for the electronic dictionary of Embodiment 1 of this invention.

The user clicks on the area for search in the menu bar using the mouse 1b. The word to be searched for is input using the keyboard 1a. In the example in FIG. 6, "construction" is input as the word to be searched for. When the input of the English word is completed and the return key is pressed, the English word and the corresponding Japanese word are searched for in the dictionary and displayed on the screen, as shown in FIG. 7.

The above operation is fundamentally analogous to that of electronic dictionary devices of the prior art.

Next, when a user wants to mark a displayed word, the user selects the area to be marked using the mouse cursor (Step S3).

The user clicks on the area "mark" in the menu bar. Then two menu items are displayed: "add mark" and "remove mark", as shown in FIG. 8. The user selects "add mark" from the menu (Step S4).

The corresponding mark file is searched for, and a determination as to whether the selected English word is already in the file or not is made (Step S5). When the word is already present, the process moves to Step S7. When the word is not present, the process goes to Step S6.

A record corresponding to the selected word is created (Step S6).

The mark number is incremented (by only 1) (Step S7). If the record is created for the word for the first time, then (mark number)=1. For a word that already has a record, the prior mark number n is incremented by 1. The (mark number)=n+1.

The above operation allows a mark to be attached to the desired word. This allows the user to display on screen the mark line and the mark number when subsequently searching for and displaying the same English word, or when searching for and displaying an English word which is close to that word in the dictionary.

Figure 3:
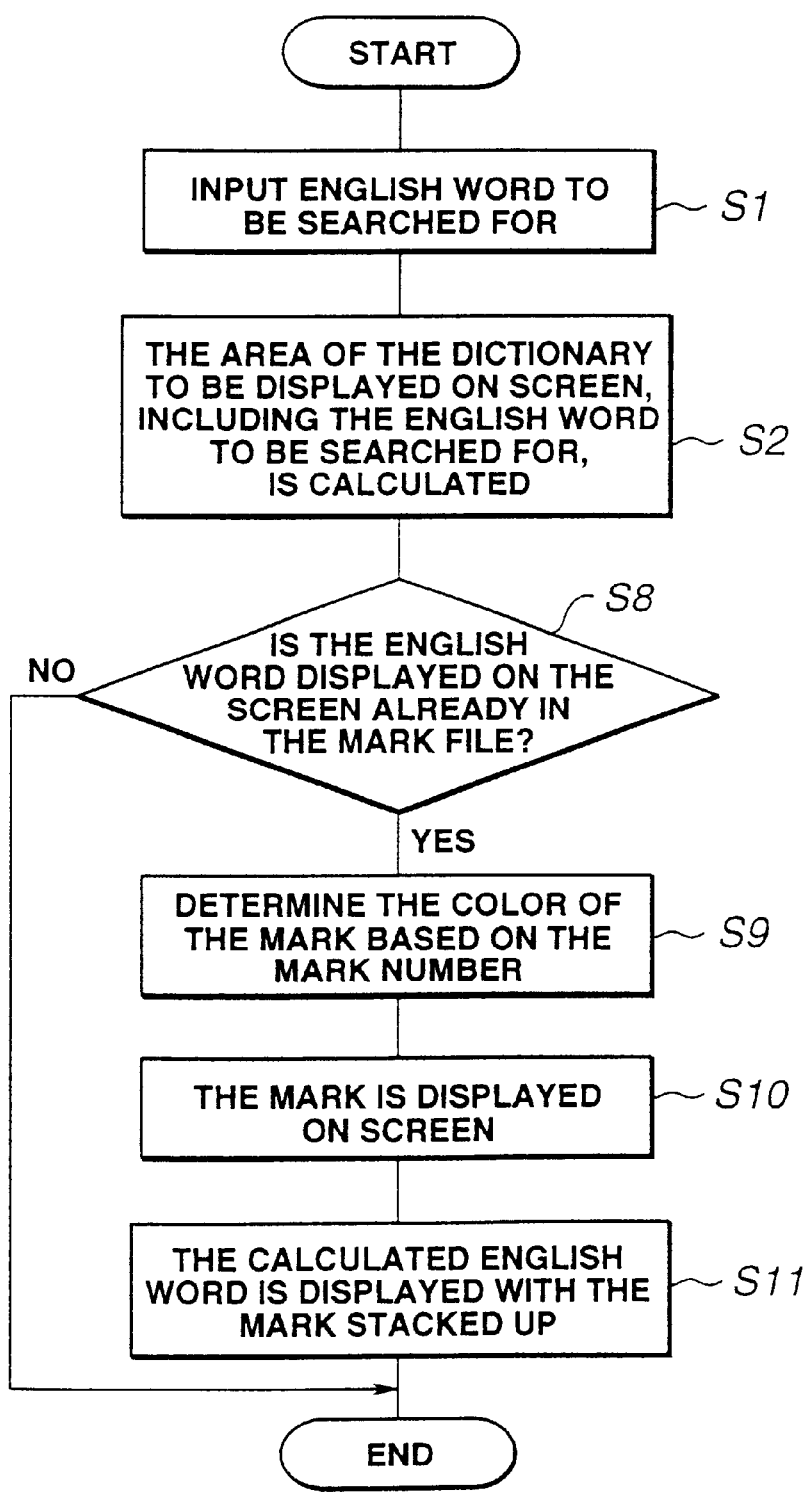
FIG. 3 is a flow chart of the process for determining color marks in the electronic dictionary of Embodiment 1 of this invention.

This process will be explained through the flow chart in FIG. 3.

The English word to be searched for is input (Step S1).

The area of the dictionary for display on the screen, including the English word to be searched for, is calculated (Step S2).

A determination is made about whether or not the English word displayed on the screen is already present in the mark file 7 (Step S8). The CPU 3 searches the word definition field 7W for the mark file. As shown in FIG. 4, the word definition field 7W holds many words, and these are searched. If, as a result of the search, the corresponding word is not found, the process ends. In this instance, no mark is added, as shown in FIG. 7. On the other hand, if the corresponding word is present, the mark number is read from the mark number field 7W-2 defined for that record. Next the process moves to Step 9.

The color of the mark is determined by the mark number (Step S9). Based on the mark number read in step 8, the mark number color table 7C and 7W in FIG. 4 are searched, and the color to be displayed is determined. For instance, if the mark number is between 1 and 10, the color yellow is added to the text. If the mark number is between 11 and 20, the color red is added.

As shown in FIG. 9, the mark is displayed on the screen (Step S10).

In Step S10, the English word is displayed with the mark to be displayed superimposed (Step S11).

The above process allows for marks in yellow, red, and other colors different from the black and white screen background to be displayed on the screen, and for the searched for word to be displayed.

The above description has shown how a mark is set. The process used to clear a mark is performed as follows.

This process can be performed manually by selecting mark clear from the pull-down menu in FIG. 8. However, it would be desirable to have the CPU perform this automatically. For instance, the CPU could automatically clear marks after a prescribed period (one month or one year, for example) has passed according to the timer 8. Of course, clear operations can be performing using different means and timing for each mark file.

When attaching a mark, the user does so manually when searching for a word, as shown in FIG. 8. Other methods, such as enabling selection of another mode whereby a mark it attached automatically when searching for a word, would also be possible. For instance, prior to starting a search, the user could select manual mode or automatic mode. In manual mode, processing would occur as shown in FIG. 2; in automatic mode, processing would occur so as to always add a mark.

In addition, a mode which displays on screen only those words which are marked would be beneficial. At this time, the words would be displayed on screen, sorted by search frequency in ascending or descending order.

In addition, searches are executed via pull down menus. The number of times a mark is not added is counted. If this count number exceeds a prescribed value, the mark affixed to that word is eliminated automatically. Such a feature could be added to the system. However, in this instance, the automatic mark feature cannot be used as is.

(Merits)

In the embodiment described above, the marks attached to words in the display are extremely useful. As a result, words that are difficult for the user or that the user wants to make a note of can be marked, allowing the user to confirm them easily even when a considerable amount of words and information is displayed on the screen.

In addition, an area that has had a mark added once can have more marks added later. Furthermore, the number of marks added is displayed on the screen. Consequently, the user can readily tell how important that word or information is.

Furthermore, the color of the mark displayed on screen will change automatically, depending on the number of marks. As a result, the user can readily check visually how important that word or information is.

Moreover, because the mark files are created separately for each user, marks for each person can be added to the dictionary even when the electronic dictionary program is used in a multi-user environment.

(Modification Example)

This invention is not limited to the embodiment described above and permits of various modifications.

Figures 10, 11:
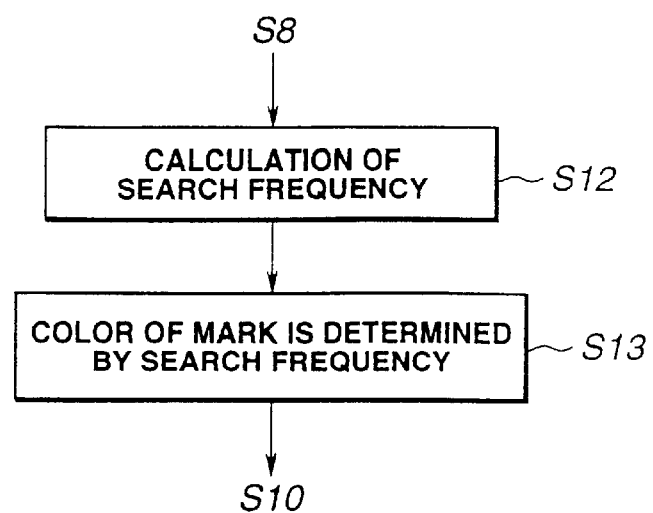
FIG. 10 shows another example of the internal structure of the mark files in the electronic dictionary of Embodiment 1 of this invention.
FIG. 11 is another partial flow chart of the process for determining color marks in the electronic dictionary of Embodiment 1 of this invention.

For instance, the CPU 3 in FIG. 1 can be provided with calendar information and time information by the timer 8. In addition to recording the time and date of a prior search in the mark file 7, the CPU 3 can also display the time of the previous search when another search is done for the same word. In this instance, the structure of the word definition field 7W in the mark file would be as shown in FIG. 10. In other words, the time and date field 7W-3 for the previous search is added by adding the word field 7W-1 and the mark number field 7W-2. The time and date of the previous search are stored for each word. By establishing a plurality of 7W-3 fields, times and dates preceding the previous one may also be stored.

In addition, the CPU 3 may also display the frequency of the search when a word is searched for many times. FIG. 11 shows a flow chart for this situation. The steps in this drawing include step S9 from FIG. 3. The process moves to step S12 in FIG. 11 after step S8 in FIG. 3. In addition to the time and date for each search in the mark file 7, the time when the search was first performed is stored. In step 12, the duration is obtained from the time of the first and most recent searches. Dividing this by the number of times the search was performed yields the search frequency. In other words (search frequency)=(number of times a search was performed)/{(time of most recent search)−(time of first search)}. This is expressed as number of times per day, number of times per week, or number of times per month. In step S13, the color of the mark is determined by the search frequency. Determining the color based on the content of the color definition field is the same as was described above. FIG. 12 shows an example of the content of the color definition 7C in this instance. By displaying the color based on the frequency in this fashion, the user can get detailed information. The user can readily tell which words represent his or her weak points. Note that the color of the mark may be changed based on the frequency, instead of the number of times as described above.

In the foregoing description, text was displayed over a yellow or red mark; the method of representation is not limited thereto. For example, the color of the font itself can be changed, or the style of the characters (Mincho, Gothic) may be changed. In addition, the brightness of the characters can be changed, or the characters can be made to flash. For instance, when the number of marks or the frequency is high, the brightness can be increased, or the flash interval can be shortened. Conversely, when the number or frequency is low, the brightness can be reduced, or the flash interval can be lengthened.

When a plurality of users are using the device and many mark files 7 are created, the following functions should be added.

Each person who has a mark file 7 should be able to select his or her own colors and style for the text. The threshold value for the color designated in the mark number 7C-1 in FIG. 4 can be changed for each mark file, or the color designated by the field 7C-2 can be changed for each mark file 7. Moreover, a separate field for designating the style can be set up by adding it to the word definition field 7W.

In addition, an operating template can be set up to hold a mark file 7 for each user. For instance, a system could be created in which each type of dictionary to be used is stored in the work file 7. When a user code is entered into the electronic dictionary, the English-Japanese dictionary will start up for one person and a Japanese language dictionary will start up for another person.

Furthermore, the field representing the object of the search should not be limited to words, but should include other fields. For instance, fields for meaning or the translation of a word could be created. Searches could then be performed from this field, and the search results could be appended to the word as a mark.

In addition, users should be able to use the mark number field as a search object and do a reverse search. In other words, the user designates a search number by entering it from the keyboard. Words (records) that exceed the search number are extracted from the mark number field 7W-2 of the word number definition table 7W. Then the words are read from the word field 7W-1 that corresponds to the extracted record and displayed. Such a feature would allow users to find words that have been searched for frequently and display them all at once, thus alerting users to important words that are used frequently.

INDUSTRIAL APPLICABILITY

The present invention provides an electronic dictionary that can display searched text while applying attributes reflecting the search frequency.

The present invention further provides an electronic dictionary that can be shared by a plurality of users.

The present invention still further provides an electronic dictionary that can automatically select text to be used by each user.

The present invention still further provides an electronic dictionary that lets the user know when the previous search was performed.

The present invention still further provides an electronic dictionary that prevents the accumulation of old attribute data.

The present invention still further provides an electronic dictionary that can inform users of the number of times a search has been performed.

The present invention still further provides an electronic dictionary that allows users to readily ascertain attribute data visually.

The present invention still further provides an electronic dictionary that can prevent users from overlooking text attribute data.

What is claimed is:

1. An electronic text display device, comprising:

first memory means for storing one or more records;

second memory means for storing attribute data indicating the search status of a record that has been searched for one or more times from the first memory means;

display means for displaying the record being searched for; and processing means for searching the first memory means for the record indicated, reading out from the second memory means the attribute data corresponding to the record being searched for, displaying on the display means the record being searched for in a manner which is based on the read out attribute data, and storing in the second memory means the number of times that a search has been performed for a specific record being searched for, wherein, when the processing means searches for a record which is located close to the specific record being searched for and displays it on the display means, the processing means displays on the display means the specific record in a manner that corresponds to the attribute data which is stored in the second memory means and after a certain period of time, automatically erases the attribute data.

2. An electronic text display device as defined in claim 1, wherein the processing means, in the course of searching for a record from the first memory means, updates, on the basis of the new search, the attribute data which is associated with this record and which is stored in the second memory means.

3. An electronic text display device as defined in claim 1, wherein the processing means, in the course of searching for a record from the first memory means, creates attribute data associated with this record in the event that attribute data associated with this record is not stored in the second memory means.

4. An electronic text display device as defined in claims 1, 2, or 3, wherein the second memory means comprises:

a plurality of memory areas created for each of a plurality of users; and each of the plurality of memory areas storing attribute data.

5. An electronic text display device as defined in claim 4, wherein the first memory means stores text tables of a plurality of types, the plurality of memory areas in the second memory means store data designating which of the plurality of types of text table should be used, and based on this designation data, the processing means searches for the corresponding text table in the first memory means.

6. An electronic text display device as defined in claim 5, further comprising:

a timer which outputs a time signal;

wherein the processing means stores the time signal when the first memory means is searched, and additionally displays the search time based on the aforementioned time signal on the electronic text display device.

7. An electronic text display device as defined in claim 6, wherein the processing means refers to time signals from the timer to erase at prescribed times attribute data stored in the second memory means.

8. An electronic text display device as defined in claims 1, 2, or 3, further comprising:

a timer which outputs a time signal;

wherein the processing means stores the time signal when the first memory means is searched, and additionally displays the search time based on the time signal on the electronic text display device.

9. An electronic text display device as defined in claim 8, wherein the processing means refers to time signals from the timer to erase at prescribed times attribute data stored in the second memory means.

10. An electronic text display device as defined in claims 1, 2 or 3, wherein, in the event that the number of times that attribute data has not been updated during previous searches exceeds a prescribed number, the attribute data is erased.

11. An electronic text display device as defined in claims 1, 2 or 3, wherein the processing means stores a count of the number of times that a search has been performed for a given record, and stores this value as attribute data in the second memory means.

12. An electronic text display device comprising:
input means for indicating text to be searched for;
first memory means for storing a text table composed of one or more records;
second memory means for storing attribute information indicating the search status of a record that has been searched for one or more times from the first memory means, display means for displaying the record searched for; and
processing means for receiving an output signal from the input means, searching the first memory means for the record indicated by the output signal, reading out from the second memory means the attribute data corresponding to the record being searched for, and displaying on the display means the applicable record using a display status configuration which is based on the read out attribute data,
wherein the processing means makes reference to the attribute data stored in the second memory to modify the color of the record display.

13. An electronic text display device as defined in claims 1, 2, or 3, wherein the processing means makes reference to the attribute data stored in the second memory to cause the record display to flash.

14. An electronic text display device as defined in claim 1 or 12, wherein the first memory means is connected through a communication medium with the processing means.

15. An electronic text display device as defined in claim 1 or 12, wherein the second memory means is connected through a communication medium with the processing means.

16. An electronic text display device as defined in claim 1 or 12, wherein the first and second memory means are provided in a server which is connected through a communication medium with the processing means.

17. An electronic text display device as defined in claim 1 or 12, further comprising a browser software for reading the record in the first memory means through the communication medium, wherein the attribute information in the second memory means includes a plurality of mark files corresponding to a plurality of users who use the browser software, and the browser software defines an operation condition of the corresponding user according to the mark file.

18. An electronic text display method, comprising:
a first step in which a first memory means, which stores a text table composed of one or more records, is searched when an output signal is received from an input means for initiating a text search;
a second step in which attribute data indicating the search status of a record, which has been searched for one or more times from the first memory means in the first step, is read out from a second memory means;
a third step in which the record searched for in the first step is displayed in a manner which is based on the attribute data read out in the second step, and
a fourth step in which the record indicated by the output signal is searched from the first memory means when the output signal is received from the input means, the attribute data of the second memory means corresponding to the specific record being searched for is read out, and the applicable specific record is displayed on the display means in a manner which is based on the read out attribute data,
wherein said fourth step further comprises storing in the second memory means as attribute data a number corresponding to searches performed for the applicable specific record, and wherein when a record which is located close to the specific record being searched for is searched for and displayed on the screen, the specific record is displayed on the screen in a manner that corresponds to the attribute data stored in the second memory means and after a certain period of time automatically erases the attribute data.

19. The electronic text display method of claim 18, wherein the substep of searching for a record from the first memory means further comprises updating, on the basis of the new search, the attribute data which is associated with this record and which is stored in the second memory means.

20. The electronic text display method of claim 18, wherein the substep of searching for a record from the first memory means further comprises creating attribute data associated with this record in the event that attribute data associated with this record is not stored in the second memory means.

21. The electronic text display method of claim 18, further comprising defining the second memory means as comprising a plurality of memory areas created for each of a plurality of users, wherein each of the plurality of memory areas store attribute data.

22. The electronic text display method of claim 21, wherein the first step further comprises storing text tables of a plurality of types, the plurality of memory areas in the second memory means store data designating which of the plurality of types of text table should be used, and based on this designation data, and wherein the fourth step for processing further comprises searching for the corresponding text table in the first memory means.

23. The electronic text display method of claim 18, wherein the fourth step for processing further comprises retaining a time signal provided by a timer when the first memory means is searched, and displaying the search time based on the time signal on the electronic text display device.

24. The electronic text display method of claim 23, wherein retaining further comprises erasing at prescribed times attribute data stored in the second memory means based on time signals from the timer.

25. The electronic text display method of claim 18, further comprising erasing the attribute data when the number of times that attribute data has not been updated during previous searches exceeds a prescribed number.

26. The electronic text display method of claim 18, wherein the fourth step of processing further comprises accumulating a count of the number of times that a search has been performed for a given record, and storing this value as attribute data in the second memory means.

27. The electronic text display method of claim 18, wherein the fourth step of processing further comprises making reference to the attribute data stored in the second memory to modify the color of the record display.

28. The electronic text display method of claim 18, wherein the first memory means is connected through a communication medium with the processing means.

29. The electronic text display method of claim 18, wherein the second memory means is connected through a communication medium with the processing means.

30. The electronic text display method of claim 18, wherein the first and second memory means are provided in a server which is connected through a communication medium with a processing means for processing.

31. The electronic text display method of claim 18 further comprising utilizing a browser software for reading the record in the first memory means through the communication medium, wherein the attribute information in the second memory means includes a plurality of mark files corresponding to a plurality of users who use the browser software, and the browser software defines an operation condition of the corresponding user according to the mark file.

32. A machine-readable storage medium for storing a program for executing a process comprising:
   a first step in which an output signal is received by a computer from an input means for initiating a text search, and a first memory means, which stores a text table composed of one or more records, is searched;
   a second step in which attribute data indicating the search status of a record, which has been searched for one or more times from the first memory means in the first step, is read out from a second memory means;
   a third step in which the record searched for in the first step is displayed in a manner which is based on the attribute data read out in the second step, and
   a fourth step in which the record indicated by the output signal is searched from the first memory means when the output signal is received from the input means, the attribute data of the second memory means corresponding to the specific record being searched for is read out, and the applicable specific record is displayed on the display means in a manner which is based on the read out attribute data,
   wherein said fourth step further comprises storing in the second memory means as attribute data a number corresponding to searches performed for the applicable specific record, and wherein when a record which is located close to the specific record being searched for is searched for and displayed on the screen, the specific record is displayed on the screen in a manner corresponding to the attribute data stored in the second memory means and after a certain period of time automatically erases the attribute data.

33. The machine readable storage medium of claim 32, wherein the substep of searching for a record from the first memory means further comprises updating, on the basis of the new search, the attribute data which is associated with this record and which is stored in the second memory means.

34. The machine readable storage medium of claim 32, wherein the substep of searching for a record from the first memory means further comprises creating attribute data associated with this record in the event that attribute data associated with this record is not stored in the second memory means.

35. The machine readable storage medium of claim 32, further comprising defining the second memory means as comprising a plurality of memory areas created for each of a plurality of users, wherein each of the plurality of memory areas store attribute data.

36. The machine readable storage medium of claim 35, wherein the first step further comprises storing text tables of a plurality of types, the plurality of memory areas in the second memory means store data designating which of the plurality of types of text table should be used, and based on this designation data, and wherein the fourth step for processing further comprises searching for the corresponding text table in the first memory means.

37. The machine readable storage medium of claim 32, wherein the fourth step for processing further comprises retaining a time signal provided by a timer when the first memory means is searched, and displaying the search time based on the time signal on the electronic text display device.

38. The machine readable storage medium of claim 37, wherein retaining further comprises erasing at prescribed times attribute data stored in the second memory means based on time signals from the timer.

39. The machine readable storage medium of claim 32, further comprising erasing the attribute data when the number of times that attribute data has not been updated during previous searches exceeds a prescribed number.

40. The machine readable storage medium of claim 32, wherein the fourth step of processing further comprises accumulating a count of the number of times that a search has been performed for a given record, and storing this value as attribute data in the second memory means.

41. The machine readable storage medium of claim 32, wherein the fourth step of processing further comprises making reference to the attribute data stored in the second memory to modify the color of the record display.

42. The machine readable storage medium of claim 32, wherein the first memory means is connected through a communication medium with the processing means.

43. The machine readable storage medium of claim 32, wherein the second memory means is connected through a communication medium with the processing means.

44. The machine readable storage medium of claim 32, wherein the first and second memory means are provided in a server which is connected through a communication medium with a processing means for processing.

45. The machine readable storage medium of claim 32 further comprising utilizing a browser software for reading the record in the first memory means through the communication medium, wherein the attribute information in the second memory means includes a plurality of mark files corresponding to a plurality of users who use the browser software, and the browser software defines an operation condition of the corresponding user according to the mark file.

46. An electronic text display device, comprising:
   input means for initiating a text search;
   first memory means for storing a text table composed of one or more records;
   second memory means for storing attribute data indicating the search status of a record that has been searched for one or more times from the first memory means;
   display means for displaying the record being searched for; and
   processing means for searching the first memory means for the record indicated by an applicable output signal when the output signal is received from the input means, reading out from the second memory means the attribute data corresponding to the record being searched for, and displaying on the display means the applicable record in a manner which is based on the read out attribute data, wherein the processing means is structured such that it changes the color of the record being searched for and displayed on the basis of the attribute data which is stored in the second memory means, and wherein when the processing means searches for a record which is located close to the record being searched for and displays it on the display means, the processing means displays on the display means the record being searched for in a color which is stored in the second memory means.

* * * * *